United States Patent
Schulz et al.

(10) Patent No.: US 10,055,749 B2
(45) Date of Patent: Aug. 21, 2018

(54) LOCAL CONTEXTUAL DISPLAY

(71) Applicant: PAYPAL, INC., San Jose, CA (US)

(72) Inventors: Egan Schulz, San Jose, CA (US); William R. Clarke, San Jose, CA (US); Javier Diaz-Infante, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 366 days.

(21) Appl. No.: 13/930,548

(22) Filed: Jun. 28, 2013

(65) Prior Publication Data
US 2014/0289029 A1  Sep. 25, 2014

Related U.S. Application Data

(60) Provisional application No. 61/803,737, filed on Mar. 20, 2013.

(51) Int. Cl.
*G06Q 30/02* (2012.01)

(52) U.S. Cl.
CPC ..... *G06Q 30/0211* (2013.01); *G06Q 30/0251* (2013.01); *G06Q 30/0267* (2013.01)

(58) Field of Classification Search
CPC .................................................... G06Q 30/02
See application file for complete search history.

(56) References Cited

U.S. PATENT DOCUMENTS

| | | | | |
|---|---|---|---|---|
| 8,341,529 B1 * | 12/2012 | Li | .................... | G06F 17/30861 715/741 |
| 2005/0075932 A1 * | 4/2005 | Mankoff | ........... | G06F 17/30011 705/14.35 |
| 2005/0125382 A1 * | 6/2005 | Karnawat | ......... | G06F 17/30867 |
| 2006/0190330 A1 * | 8/2006 | Tollinger et al. | ................ | 705/14 |
| 2007/0214000 A1 * | 9/2007 | Shahrabi | .............. | G06Q 10/063 705/1.1 |
| 2007/0233551 A1 * | 10/2007 | Levy | ................ | G06Q 10/06395 705/347 |
| 2008/0071743 A1 * | 3/2008 | Jhaveri | ............. | G06F 17/30696 |
| 2008/0270231 A1 * | 10/2008 | Li et al. | .......................... | 705/14 |
| 2009/0288012 A1 * | 11/2009 | Hertel | ..................... | G06Q 20/02 715/738 |
| 2011/0258035 A1 * | 10/2011 | Oren et al. | .................. | 705/14.43 |
| 2011/0288921 A1 * | 11/2011 | King | ...................... | G06Q 30/02 705/14.23 |
| 2011/0313839 A1 * | 12/2011 | Walsh | ......................... | 705/14.35 |
| 2012/0066003 A1 * | 3/2012 | Collier | ................. | G06Q 10/063 705/4 |
| 2012/0136712 A1 * | 5/2012 | Chang et al. | ............... | 705/14.38 |
| 2012/0226543 A1 * | 9/2012 | Dayala | ................... | G06Q 30/02 705/14.26 |
| 2013/0054396 A1 * | 2/2013 | Goldfinger | ......... | G06Q 30/0238 705/21 |
| 2013/0073363 A1 * | 3/2013 | Boal | .......................... | 705/14.23 |

\* cited by examiner

*Primary Examiner* — Vincent M Cao
(74) *Attorney, Agent, or Firm* — Haynes & Boone, LLP (57) ABSTRACT

A service provider system remembers feedback by a user when the user selects an offer, a presented option, or other content from a page or display on a user device. The user is then taken to a new page or screen with details about the offer, option, or other content. When the user goes back to the original page or screen, the page is revised based on the user feedback. For example, a dialog box may pop up over the selected offer to ask the user whether the user accepted the offer or is not interested in the offer. If so, the offer disappears and subsequent pages may not show the selected offer again.

18 Claims, 7 Drawing Sheets

LOCAL CONTEXTUAL DISPLAY

CROSS REFERENCE TO RELATED APPLICATION

Pursuant to 35 U.S.C. § 119(e), this application claims priority to the filing date of U.S. Provisional Pat. Application Ser. No. 61/803,737, filed Mar. 20, 2013, which is incorporated by reference in its entirety.

BACKGROUND

Technical Field

The present application generally relates to online displays.

Related Art

Users of consumer devices, such as smart phones, PCs, and computing tablets, typically navigate through different screens on the device to achieve a desired goal, such as performing a transaction or obtaining information. A user may select rows, links or buttons that redirect the user to another screen for additional information or for the next step in a transaction. This continues until the user is satisfied with the information, completes the transaction, or otherwise ends the session.

DETAILED DESCRIPTION

In one embodiment, a service provider system remembers what was selected by a user when the user selects an offer, a presented option, or other content from a page or display on a user device. The user is then taken to a new page or screen with details about the offer, option, or other content. When the user goes back to the original page or screen, the page is revised based on the user selection. For example, a dialog box may pop up over the selected offer to ask the user whether the user accepted the offer or is not interested in the offer. If so, the offer disappears and subsequent pages may not show the selected offer again. The request to the user may also be shown as part of the interface, e.g., it changes the content of the row item from when the user was there last.

Thus, the user is provided pages that show contextual content or dialog based on what the user had previously selected or is not interested in, e.g., an inline (and/or in-flow) feedback loop that provides necessary feedback to the business, as well as enabling a more focused display of content based on that user feedback. This also enables a slicker and more user-friendly navigation for the user that eliminates content already seen or not liked by the user, resulting in a more relevant display and more efficient use of display size.

Figure 1:
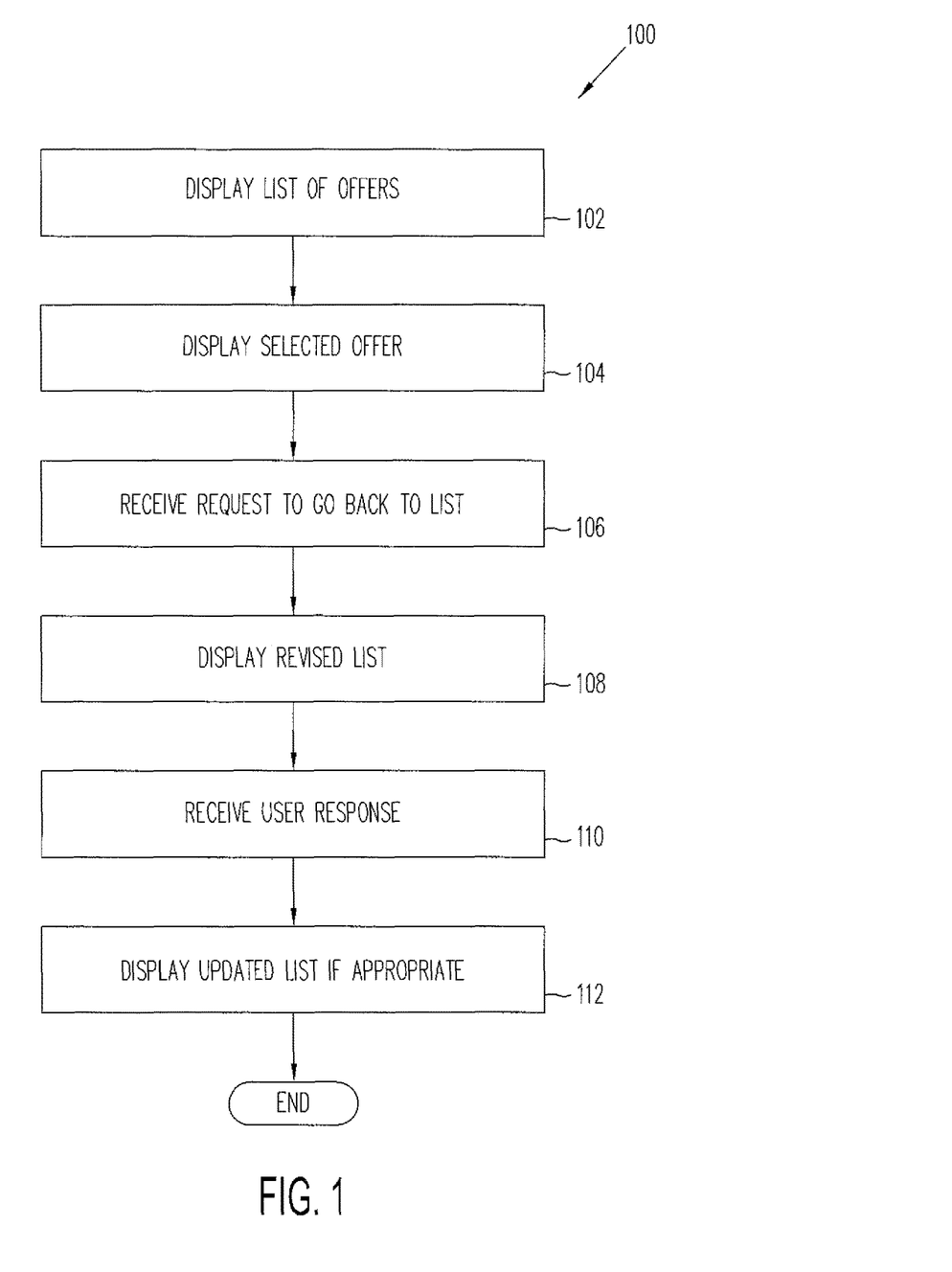
FIG. 1 is a flowchart showing a process a service provider makes in presenting contextual display according to one embodiment.

FIG. 1 is a flowchart 100 showing a process a service or payment provider makes in presenting contextual display to a user according to one embodiment. At step 102, the service provider displays a list of offers to a user on a user device. Offers may include incentives, coupons, discounts, gift cards, points, rewards, and the like. The user device may be a smart phone, PC, computing tablet, or other computing/communication device. In other embodiments, different content may be provided and is not limited to offers. For example, the user may be presented with ads, content related to a financial transaction, non-purchase related content (e.g., purely informational content), and the like. The offers may be presented when the user opens or launches an app on a user device or otherwise accesses a service provider site. The offers may be customized for the user, such as based on purchase history, preferences, previous actions, and/or current location. In one embodiment, the offers are presented before the user is authenticated by the service provider, e.g., simply launching the app without entering a password or PIN.

The offers may be presented as a list or an array, with a summary of the offer, such as merchant name and/or location, what the offer is (e.g., 30% off next purchase with the merchant), and expiration date. The user may be allowed to select the offer to view more details, such as by tapping, selecting a corresponding box, or otherwise selecting the offer from the user device. The selection is then communicated to the service provider, such as to a service provider server. The user may also or alternatively be allowed to communicate feedback on the offer. For example, the user may be able to select a button or link that indicates the user is not interested in the offer or that the user is interested in the offer. This information may be valuable if the user is interested in the offer, but not able to select the offer at the time the offer is presented. This can occur if the user does not have time to view the offer or is not a position to view the offer.

Once received, the selected offer is displayed to the user, at step 104, on the user device. The displayed offer may be on a new screen or page of the user device and contain details of the offer. Details may include conditions of use, expiration date, how to use or accept the offer, terms of the offer, and locations where the offer can be redeemed in person. These and other information may be viewed by the user in another screen or display, such as by the user selecting a button, tab, or link associated with the desired information. An offer details page may also enable the user to accept the offer, such as by selecting an appropriate link, button, or tab. Once selected, the offer may be stored with the user's digital wallet or account to be applied or used when the corresponding purchase is made. The user may also communicate other information about the offer, such as whether the user is interested in the offer, not interested in the offer, not interested in offers from same merchant, not interested in similar offers from other merchants, etc. The information may be communicated with a button or link associated with the offer. The offer or ad may also be used manually, offline, or not through an app, such as by the user showing the offer to a merchant, who processes the offer accordingly, such as manually or through a scan.

Once the user is finished viewing the selected offer or indicates the offer is not of interest, the user may desire to go back to the original list of offers page, such as by selecting a "back" or "home" button or link. This electronically communicates a request of the user to the service provider, who receives the request at step 106.

The service provider then processes the request, but instead of displaying the original page of step 102, displays a revised list or page, at step 108, based on the user's navigation and/or selection of step 104. The service provider remembers the user's selected offer and any relevant information received about the offer (such as a non-interest indication) and revises the page accordingly. For example, the selected offer may have a dialog or pop-up box asking whether the user accepted or used the offer. Other examples include whether the user wishes to see the offer again or wishes to see similar offers from the same merchant or similar merchants. One or more boxes, links, or tabs may be included that enable the user to select the desired answer(s), such as by tapping or clicking on the appropriate box, link or tab.

At step 110, the service provider receives the user response and displays an updated display, at step 112, if appropriate. For example, if the user did not use or accept the offer, the display may remain unchanged from the list of step 102, especially if the user had indicated that the user is interested in the offer or wants to keep receiving the offer. However, if the user response indicated that the user used/accepted the offer or otherwise does not want to see the offer again, the updated display would not include the offer. As such, the user is provided a less cluttered and more relevant display, responsive to one or more user actions.

The information received from the user, such as at step 110, may be used by the service provider to dynamically change the offer display in the future. This enables the service provider to provide current and up-to-date relevant ads for the user and to provide displays that accurately reflect a user interest in an offer. Ads can include offers and not just awareness. For example, an ad from a specific merchant or a type of ad may have been of interest at one point, but is no longer of interest. In that case, the user will not want to go back to a page or screen and see the same or similar ads any more. By changing the offer display page and "back" page based on current user actions, the user is presented with more relevant displays.

Note that one or more steps described herein may be omitted, combined, or performed in a different sequence as desired.

Figure 2:
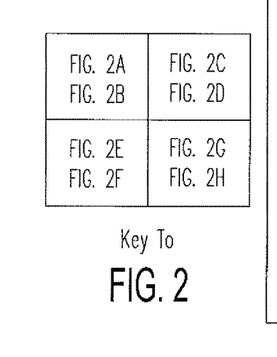
FIGS. 2A to 2H are exemplary screen shots a user may see during a sequence of displays according to one embodiment.
Figure 2A:
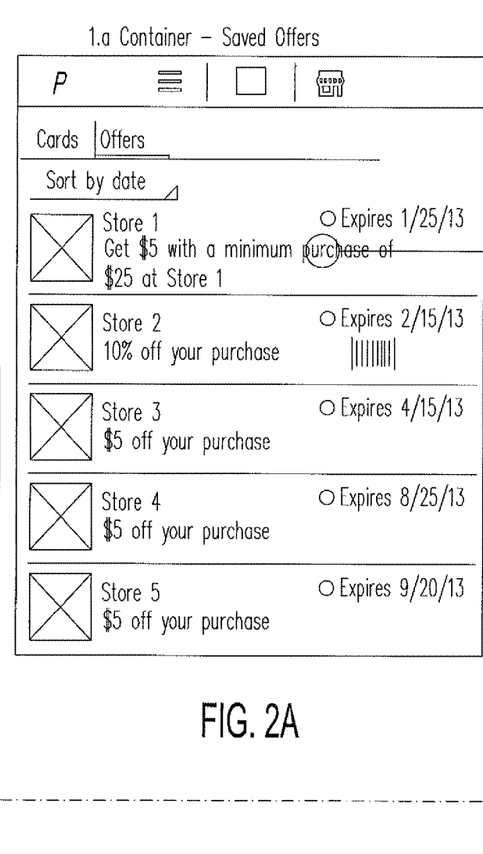

FIGS. 2A-2H are exemplary screen shots a user may see during a sequence of displays on a smart phone according to one embodiment. In FIG. 2A, a list of offers is presented on a display of a user device, such as when the user logs into the user account with the service provider, accesses the app of the service provider, a home screen widget, or simply turns on the display for the user device. The offers are sorted by date (expiration date), but can be sorted by other criteria, such as proximity to user, value of offer, favorite merchants of user, etc. As seen, the offers include merchant names, a brief description of the offer, and an expiration date of the offer. In FIG. 2A, the user selects the first offer from Store A by tapping on the offer.

Figure 2B:
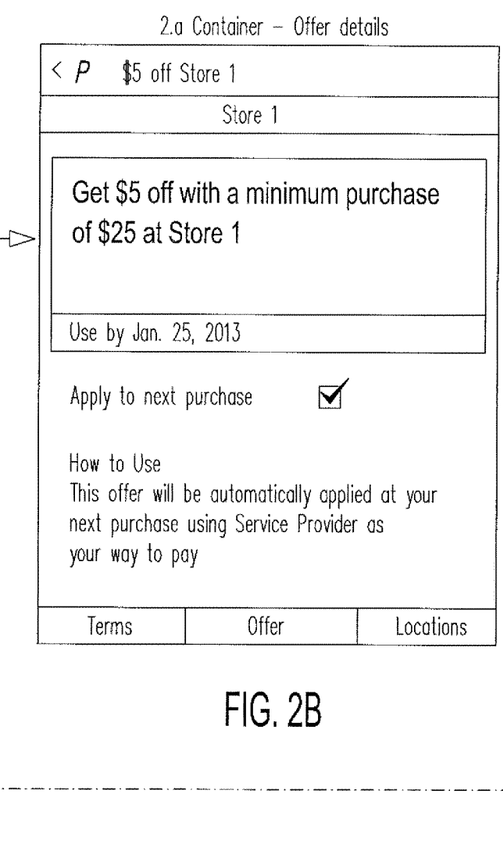

FIG. 2B shows the next screen with more details of the offer, including a box the user can select to apply the offer to the next qualifying purchase. Details include the offer ($5 off) and conditions of the offer (minimum purchase of $25 at Store A), expiration date, ability to use automatically with next qualifying purchase (by checking a corresponding box), and instructions on how the offer is used. The screen also includes tabs at the bottom for additional details of Terms, Offer, and Locations. Note that the Offer tab is highlighted as the currently selected or displayed tab.

Figure 2C:
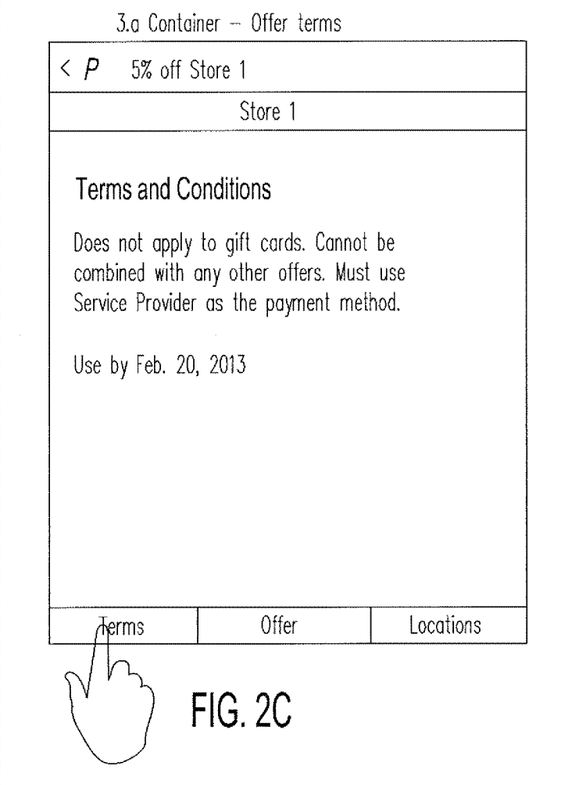

FIG. 2C is a screen the user sees when the user selects, such as by tapping, the "Terms" tab. The terms screen provides terms and conditions for the offer, including an expiration or "use by" date.

Figure 2D:
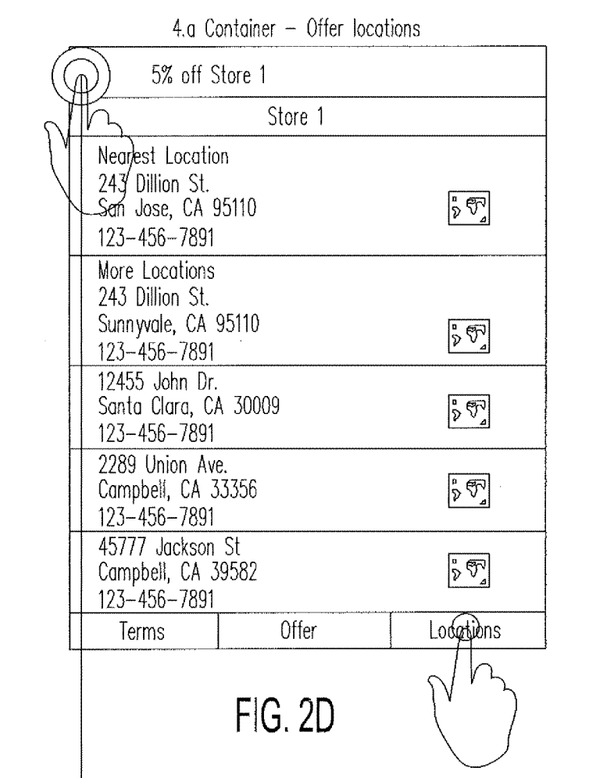

FIG. 2D shows a screen of merchant locations or locations the offer can be used at, when the user selects the "Locations" tab. The list of locations is shown with the nearest location at the top and additional locations underneath. Other ways to display or order locations can also be used, such as on a map, ordered by distance from the current user location (such as determined by the user device location), ordered by distance from the user home address, ordered by distance from the expected user location (based on a user specified location), ordered by distance from the user work address, etc. The location information includes address, city, and phone number. The list may include an address, phone number and corresponding map, as well as store hours.

Once the user is finished with the offer, the user selects a "back" or "home" button (shown as a back arrow on the upper portion of the display in FIG. 2D, which takes the user back to the list of offers, which may be the immediate previous screen or several screens back, depending on how many pages or screens the user viewed after selecting the offer.

Figure 2E:
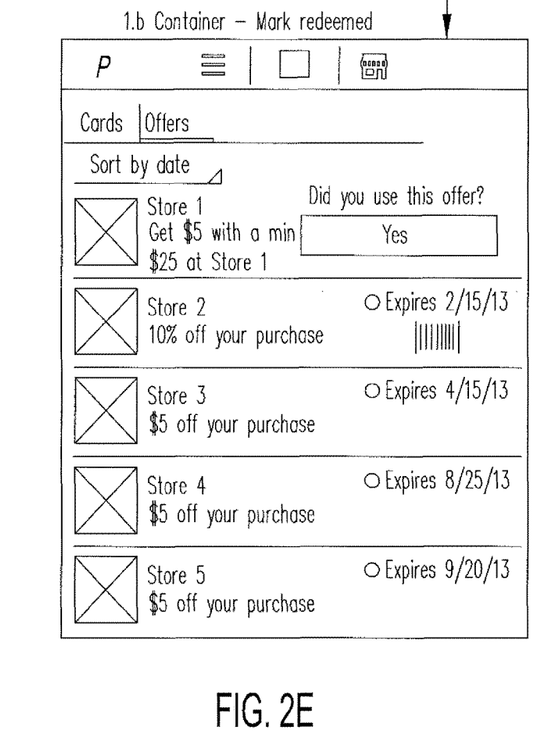

FIG. 2E shows the revised screen with an inline form requesting feedback regarding the offer. This could also be achieved with a pop-up or dialog box as the interactive element. The pop-up appears over the previously selected offer, which may be highlighted if desired. The pop-up includes a box the user can tap. In this case, there is a "Yes" button. In other embodiments, there may be a "No", an "Ignore" and/or other responses as appropriate to the question asked of the user. The button could be substituted with a check box, radio buttons, etc. The question may be different, such as whether the user is interested in this offer, other offers by the same merchant, or similar offers by other merchants.

Figure 2F:
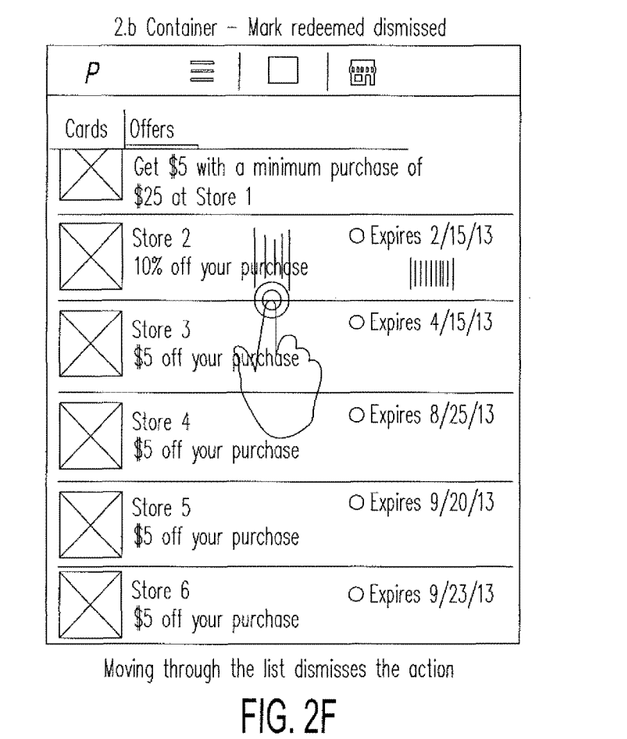

FIG. 2F shows a screen where the user ignores the question (or indicates interest in the offer, but has not accepted or used the offer) and scrolls through other offers. This results in the selected offer remaining on the offers list page. Even though not selected or used, the selected offer may be highlighted or visually identified as an offer the user has already viewed, which can save the user time by not viewing the offer again at a later time thinking that it is a new offer. FIG. 2F also shows that moving the selected offer off screen dismisses or removes the inline feedback form or pop-up.

Figure 2G:
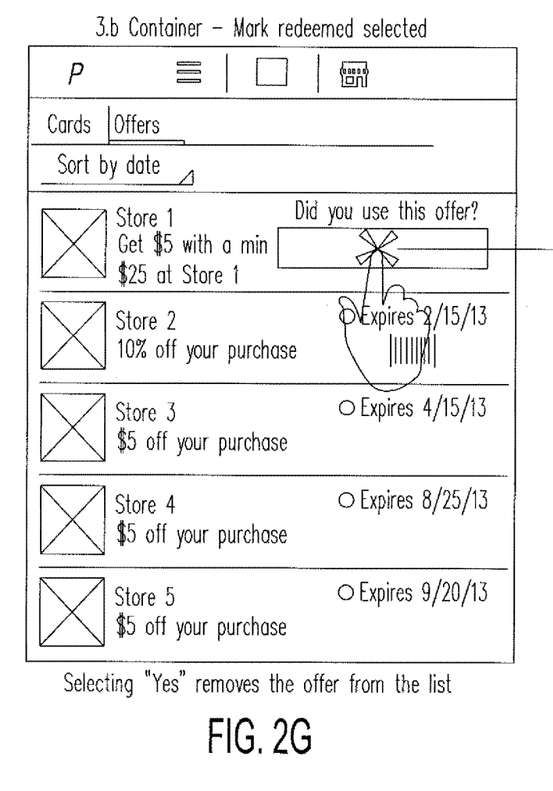

FIG. 2G shows a screen where the user selects, by tapping, the "Yes" box to indicate that the offer was used. If the user moves the selected Store A offer off the display (e.g. by tapping "Yes"), such as to view more offers on the list, the request disappears. In one embodiment, the request reappears when the user scrolls to place or move the selected offer back on the screen or display since the user indicated that they had used the offer, the offer no longer appears within the list. It is assumed in this case that the offer was a "one time use" offer.

Figure 2H:
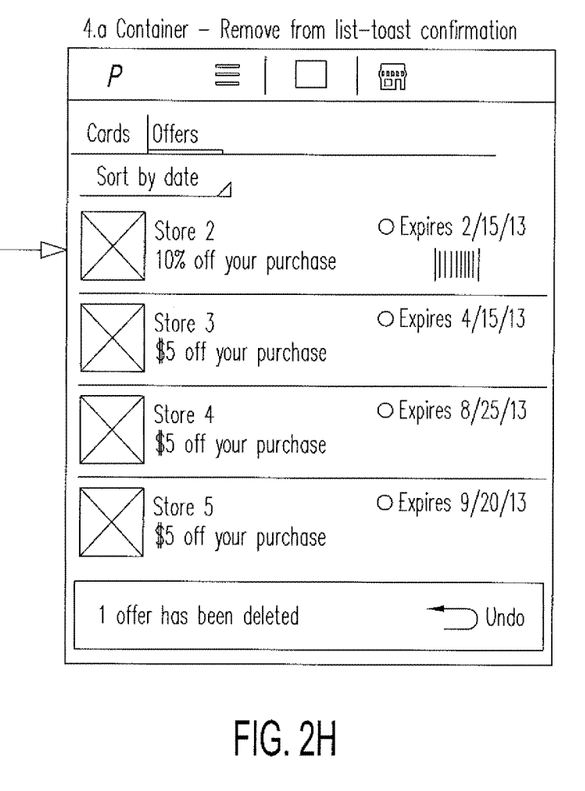

FIG. 2H shows a screen where the previously selected offer is removed from the list and no longer shown to the user because the user has already used the offer. Responses to other questions may also result in the offer being removed, such as an indication the user is not interested in the offer or the offer has expired.

Figure 3:
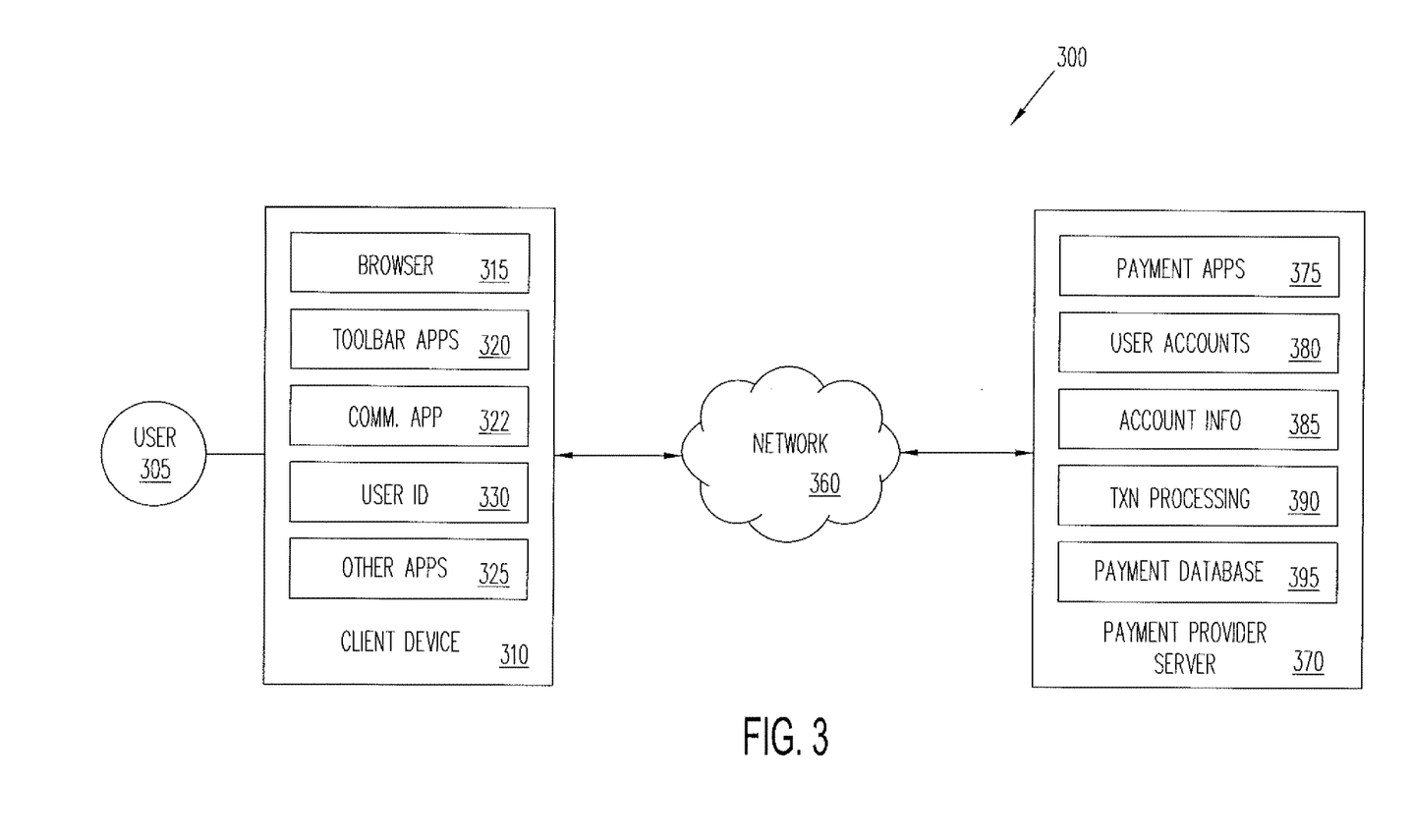
FIG. 3 is block diagram of a networked system suitable for implementing the process described herein according to an embodiment.

FIG. 3 is a block diagram of a networked system 300 configured for displaying content, such as offers, as described above, in accordance with an embodiment of the invention. System 300 includes a user device 310 and a payment provider server 370 in communication over a network 360. Payment provider server 370 may be maintained by a payment provider, such as PayPal, Inc. of San Jose, Calif. Although a payment provider device is shown, the server may be managed or controlled any suitable service provider that requires authentication as a human before communicating information. A user 305 utilizes user device 310 to view account information and perform transactions using payment provider server 370. Note that transaction, as used herein, refers to any suitable action performed using the user device, including payments, transfer of information, display of information, etc. Although only one server is shown, a plurality of servers may be utilized. Exemplary servers may include, for example, stand-alone and enterprise-class servers operating a server OS such as a MICROSOFT® OS, a UNIX® OS, a LINUX® OS, or other suitable server-based OS. One or more servers may be operated and/or maintained by the same or different entities.

User device 310 and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet, such as offers presented by the payment provider. User device 310 may also include one or more toolbar applications 320 which may be used, for example, to provide client-side processing for performing desired tasks in response to operations selected by user 305. In one embodiment, toolbar application 320 may display a user interface in connection with browser application 315.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, and texts through network 360, as well as applications that enable the user to communicate and transfer information through and with the payment provider as discussed above. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider. A communications application 322, with associated interfaces, enables user device 310 to communicate within system 300.

Payment provider server 370 may be maintained, for example, by an online payment service provider which may provide information to and receive information from user 305, such as for making payments, viewing offers, and responding to offers. In this regard, payment provider server 370 includes one or more payment applications 375 which may be configured to interact with user device 310 over network 360 to facilitate offer transactions with user 305 of user device 310.

Payment provider server 370 also maintains a plurality of user accounts 380, each of which may include account information 385 associated with consumers, merchants, and funding sources, such as credit card companies. For example, account information 385 may include private financial information of users of devices such as account numbers, passwords, device identifiers, user names, phone numbers, credit card information, bank information, identification cards, photos, offers available to the user, or other information which may be used to facilitate transactions by user 305.

A transaction processing application 390, which may be part of payment application 375 or separate, may be configured to receive information from a user device for processing and storage in a payment database 395. Transaction processing application 390 may include one or more applications to process information from user 305 for processing a payment or transfer using various selected funding instruments or cards. As such, transaction processing application 390 may store details of payment transfer from individual users, including funding source(s) used, offers, credit options available, etc. to other individuals or entities. Payment application 375 may be further configured to determine the existence of and to manage accounts for user 305, as well as create new accounts if necessary, such as the set up and management payments by the user.

Figure 4:
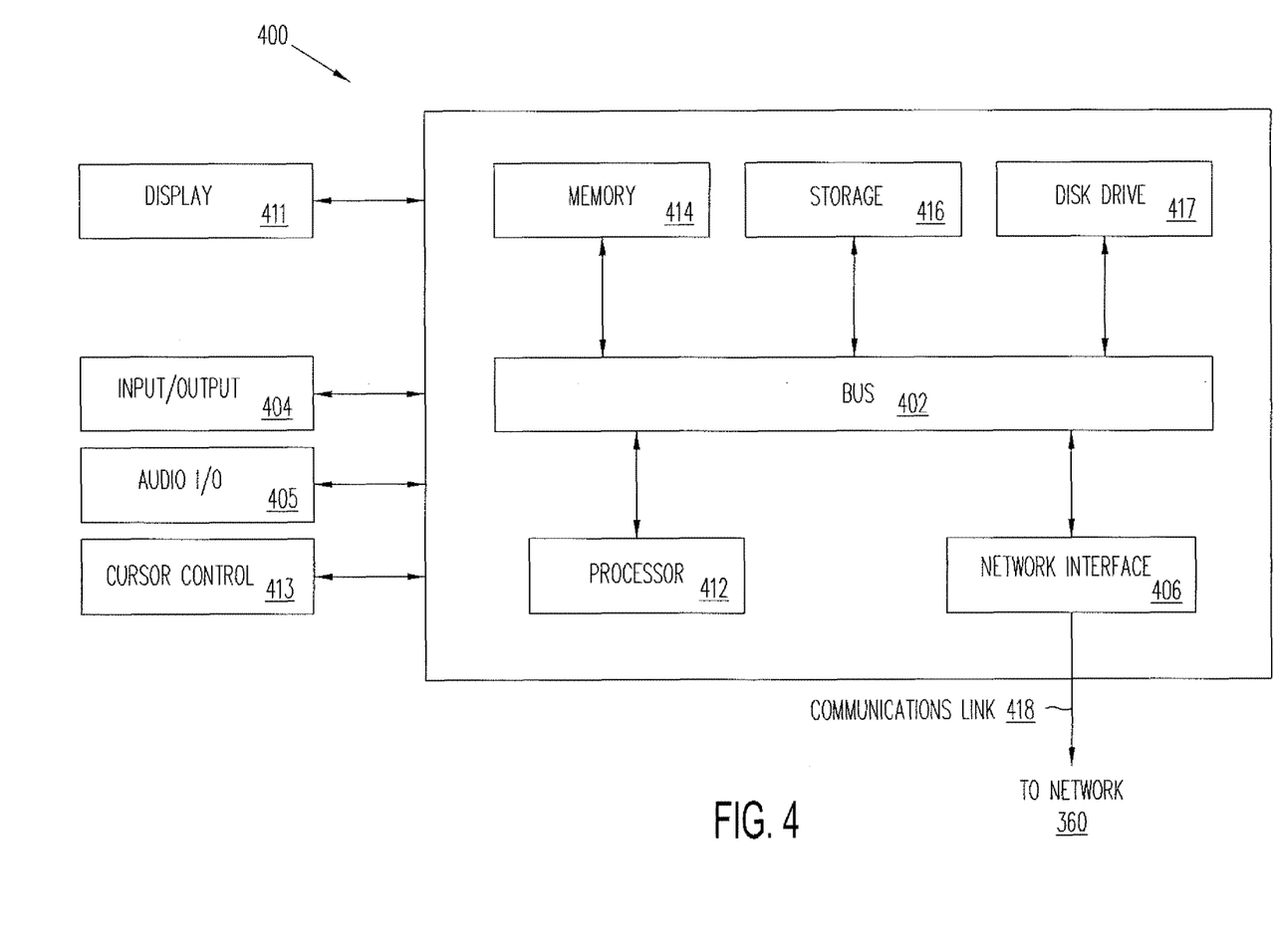
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The payment provider may utilize a network computing device (e.g., a network server) capable of communicating with the network. It should be appreciated that each of the devices utilized by users and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

We claim:

1. An system comprising:
   an electronic device comprising:
      a user interface;
      a communications module;
      a browser application;
      a non-transitory memory storing user account information, wherein the information comprises offers selected by users and a user identifier associated with the browser application; and
      one or more hardware processors coupled to the non-transitory memory; and
   a server device comprising a user database, wherein the electronic device or the server device is configured to execute instructions to cause the system to perform operations comprising:
      communicating, using the communications module of the electronic device, the user identifier to a service provider;
      matching, with the server device, the user identifier to an account contained within the user database;
      determining, based on the user identifier and data from the account contained within the user database, a plurality of offers associated with a digital wallet of the user;
      receiving, using the communications module of the electronic device from the service provider, the plurality of offers associated with the digital wallet of the user;
      automatically displaying the offers associated with the digital wallet of the user on a first screen of the user interface of the electronic device;
      receiving, through the user interface of the electronic device, a selection of an offer by the user from the plurality of offers;
      displaying, in response to the selection, content associated with the selected offer on a second screen of the user interface of the electronic device, wherein the content comprises an indication allowing for acceptance of the offer by the user to use the offer with the digital wallet;

receiving a request, through the user interface of the electronic device, to navigate back to the first screen;

in response to receiving the request to navigate back to the first screen, generating a revised first screen of the electronic device that includes an inline form positioned next to the selected offer, wherein the inline form comprises a button allowing for user feedback about the selected offer;

causing the revised first screen to be displayed on the user interface of the electronic device;

receiving, through the user interface of the electronic device a request to scroll through the plurality of offers without feedback to the inline form;

updating the revised first screen of the electronic device in response to the scroll request by removing the inline form;

communicating, using the communications module of the electronic device, data indicating the scroll request to the service provider; and updating the account contained within the user database in response to the scroll request by indicating a lack of interest to the selected offer.

2. The system of claim 1, wherein the updating the revised first screen comprises visually identifying that the offer has been viewed.

3. The system of claim 2, wherein updating the revised first screen comprises removing the selected offer.

4. The system of claim 1, wherein the offers are based on a location of the electronic device, a purchase history of the user, or preferences of the user.

5. The system of claim 1, wherein the operations further comprise providing the selected offer on the revised first screen in response to the user responding to the request for feedback with an indication that the user is interested in the offer.

6. The system of claim 1, wherein the operations further comprise updating the revised first screen to highlight the selected offer to indicate that the selected offer was previously viewed.

7. A method comprising:
receiving, using a communications module of an electronic device from a service provider, offers associated with a digital wallet of a user;

automatically displaying, on a user interface of the electronic device, a list of offers associated with a digital wallet of the user to the user on a first screen of the user interface;

receiving, through the user interface, a selection of an offer by the user from the list of offers;

displaying, in response to the selection, content associated with the selected offer on a second screen of the user interface, wherein the content comprises an indication allowing for acceptance of the offer by the user to use the offer with the digital wallet;

receiving a request, through the user interface, to navigate back to the first screen;

in response to receiving the request to navigate back to the first screen, generating a revised first screen that includes an inline form positioned next to the selected offer, wherein the inline form comprises a button allowing for user feedback about the selected offer;

causing the revised first screen to be displayed on the user interface;

receiving, through the user interface, a request to scroll through the list of offers without feedback to the inline form;

updating the revised first screen in response to the scroll request by removing the inline form; and communicating, using the communications module of the electronic device, data indicating the scroll request to the service provider.

8. The method of claim 7, wherein the updating the revised first screen comprises visually identifying that the offer has been viewed.

9. The method of claim 8, wherein updating the revised first screen comprises removing the selected offer.

10. The method of claim 7, wherein the offers are based on a location of the user, a purchase history of the user, or preferences of the user.

11. The method of claim 7, further comprising providing the selected offer on the revised first screen in response to the user responding to the request for feedback with an indication that the user is interested in the offer.

12. The method of claim 7, further comprising updating the revised first screen to highlight the selected offer to indicate that the selected offer was previously viewed.

13. A non-transitory computer readable medium having stored thereon machine-readable instructions executable to cause a machine to perform operations comprising:
receiving, by a service provider, a user identifier associated with a browser application of an electronic device of a user;

matching the user identifier to an account contained within a user database;

determining, based on the user identifier and data from the account contained within the user database, a plurality of offers associated with a digital wallet of the user;

providing the plurality of offers to the electronic device so that the electronic device automatically displays the offers associated with the digital wallet of the user on a first screen of a user interface;

receiving, from the electronic device, data indicating a request to scroll through a list of offers without feedback to an inline form positioned next to a selected offer from the plurality of offers; and updating the account contained within the user database in response to the scroll request by indicating a lack of interest to the selected offer.

14. The non-transitory computer readable medium of claim 13, wherein the account contained within the user database is updated to reduce a likelihood of providing offers associated with the selected offer to the electronic device.

15. The non-transitory computer readable medium of claim 13, wherein the offers are determined based on a location of the user, a purchase history of the user, or preferences of the user.

16. The non-transitory computer readable medium of claim 13, wherein the operations further comprise:
determining, data indicating a request to scroll through a list of offers without feedback to an inline form positioned next to a selected offer from the plurality of offers, a further offer; and providing the further offers to the electronic device so that the electronic device automatically displays the further offer on a further first screen of a user interface.

17. The non-transitory computer readable medium of claim 13, wherein the operations further comprise:
receiving, from the electronic device, a selection of an offer by the user from the plurality of offers; and communicating data associated with the offer to the electronic device.

18. The non-transitory computer readable medium of claim 13, wherein the offers associated with the selected offer comprise offers of a same category.

\* \* \* \* \*